(12) United States Patent
Aronsson et al.

(10) Patent No.: US 9,800,864 B2
(45) Date of Patent: Oct. 24, 2017

(54) GAZE CONTROLLED FOCUSING OF STEREOSCOPIC CONTENT

(75) Inventors: Pär-Anders Aronsson, Malmö (SE); Martin Ek, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 198 days.

(21) Appl. No.: 14/235,709

(22) PCT Filed: Jul. 26, 2012

(86) PCT No.: PCT/IB2012/053831
§ 371 (c)(1),
(2), (4) Date: Jan. 28, 2014

(87) PCT Pub. No.: WO2013/018004
PCT Pub. Date: Feb. 7, 2013

(65) Prior Publication Data
US 2014/0198189 A1 Jul. 17, 2014

Related U.S. Application Data

(60) Provisional application No. 61/513,531, filed on Jul. 29, 2011.

(51) Int. Cl.
*H04N 13/04* (2006.01)

(52) U.S. Cl.
CPC .............. *H04N 13/0484* (2013.01)

(58) Field of Classification Search
CPC .................................. H04N 13/0484
See application file for complete search history.

(56) References Cited

U.S. PATENT DOCUMENTS

| 6,414,681 B1 * | 7/2002 | Ohshima .............. G06F 3/012 345/428 |
| 2005/0190180 A1 * | 9/2005 | Jin .................... H04N 13/0018 345/419 |

(Continued)

FOREIGN PATENT DOCUMENTS

| DE | 102007028654 | * | 1/2009 | ......... H04N 13/0022 |
| DE | 102007028654 A1 * | 1/2009 | ......... H04N 13/0022 |
| EP | 2333640 A1 | 6/2011 | |

OTHER PUBLICATIONS

International Search Report and Written Opinion of the International Searching Authority; Nov. 16, 2012; issued in International Patent Application No. PCT/IB2012/053831.

(Continued)

*Primary Examiner* — Andy Rao
*Assistant Examiner* — Tyler Edwards
(74) *Attorney, Agent, or Firm* — James C. Edwards; Moore & Van Allen PLLC

(57) ABSTRACT

An apparatus and method generate a three-dimensional image by presenting, using a stereoscopic display, a representation of a scene comprising one or more objects, tracking a gaze of the user to determine a direction of gaze within the scene, determining depths associated with one or more objects in the scene, and determining which of the objects in the scene are inside and which are outside a comfort zone based at least in part on the direction of gaze of the user and the depths associated with the one or more objects in the scene. In some embodiments, the method includes identifying one or more objects proximate the direction of gaze of the user, determining depths associated with the one or more identified objects, determining a range of depths based at least in part on the depths associated with the one or more identified objects, and establishing the comfort zone based at least in part on the range of depths. In some embodiments, (Continued)

the method includes modifying the presented representation of the scene based on which of the objects are outside the comfort zone.

In some embodiments, the method includes focusing the stereoscopic display based at least in part on the determination of which objects are inside the comfort zone, tracking the gaze of the user to determine a second direction of gaze within the scene different from the direction of gaze within the scene, re-determining depths associated with one or more objects in the scene, re-determining which of the objects in the scene are inside and which are outside the comfort zone based at least in part on the second direction of gaze of the user and the re-determined depths associated with the one or more objects in the scene, and re-focusing the stereoscopic display based at least in part on the determination of which objects are inside the comfort zone.

20 Claims, 6 Drawing Sheets

(56) References Cited

U.S. PATENT DOCUMENTS

| | | |
|---|---|---|
| 2006/0210111 A1 | 9/2006 | Cleveland et al. |
| 2011/0228051 A1* | 9/2011 | Dedeoglu .......... H04N 13/0022 348/46 |

OTHER PUBLICATIONS

International Preliminary Report on Patentability; Feb. 13, 2014; issued in International Patent Application No. PCT/IB2012/053831.
Communication Pursuant to Article 94(3) EPC; Jan. 15, 2016; issued in European Patent Application No. 12 759 241.8.

* cited by examiner

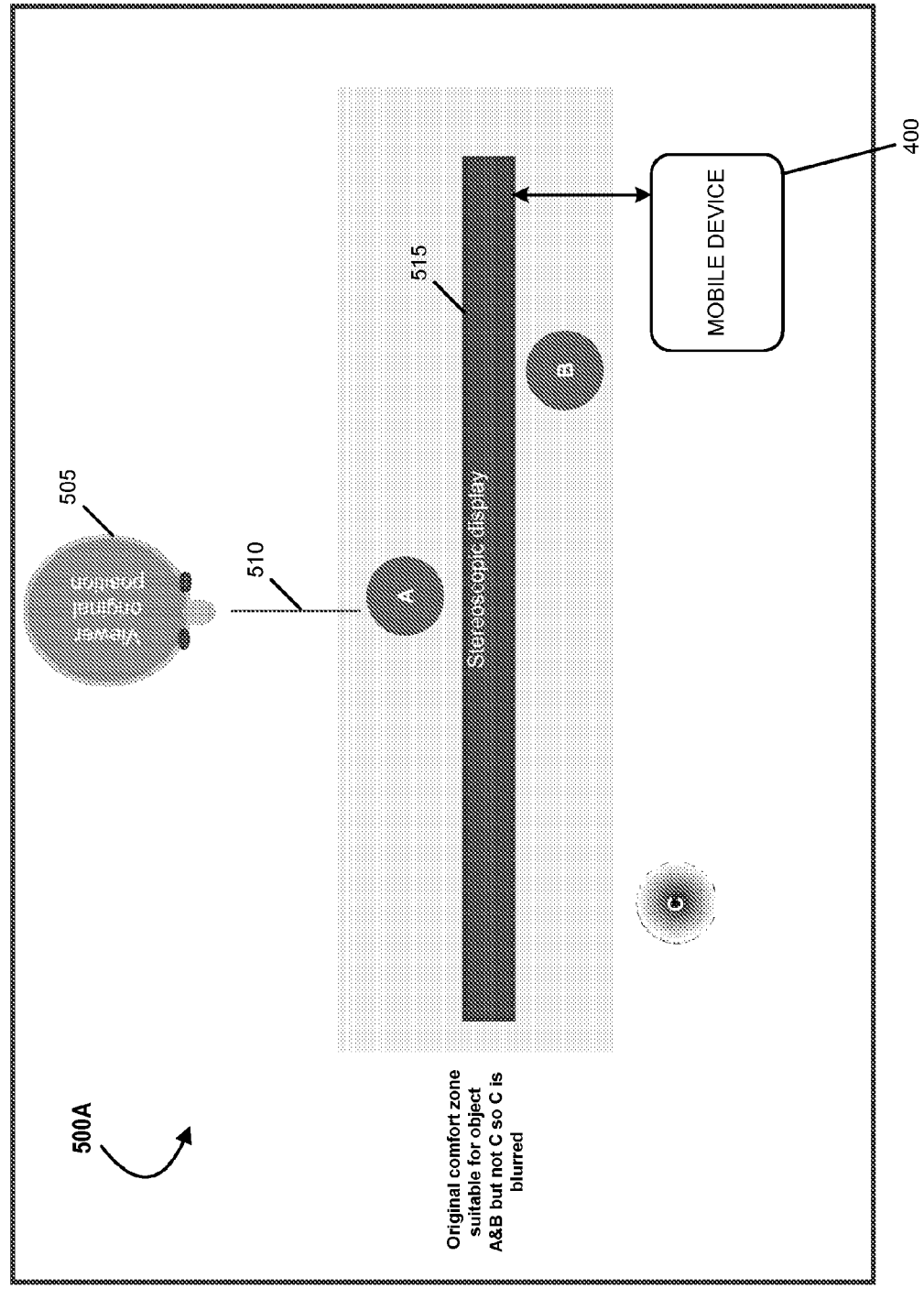

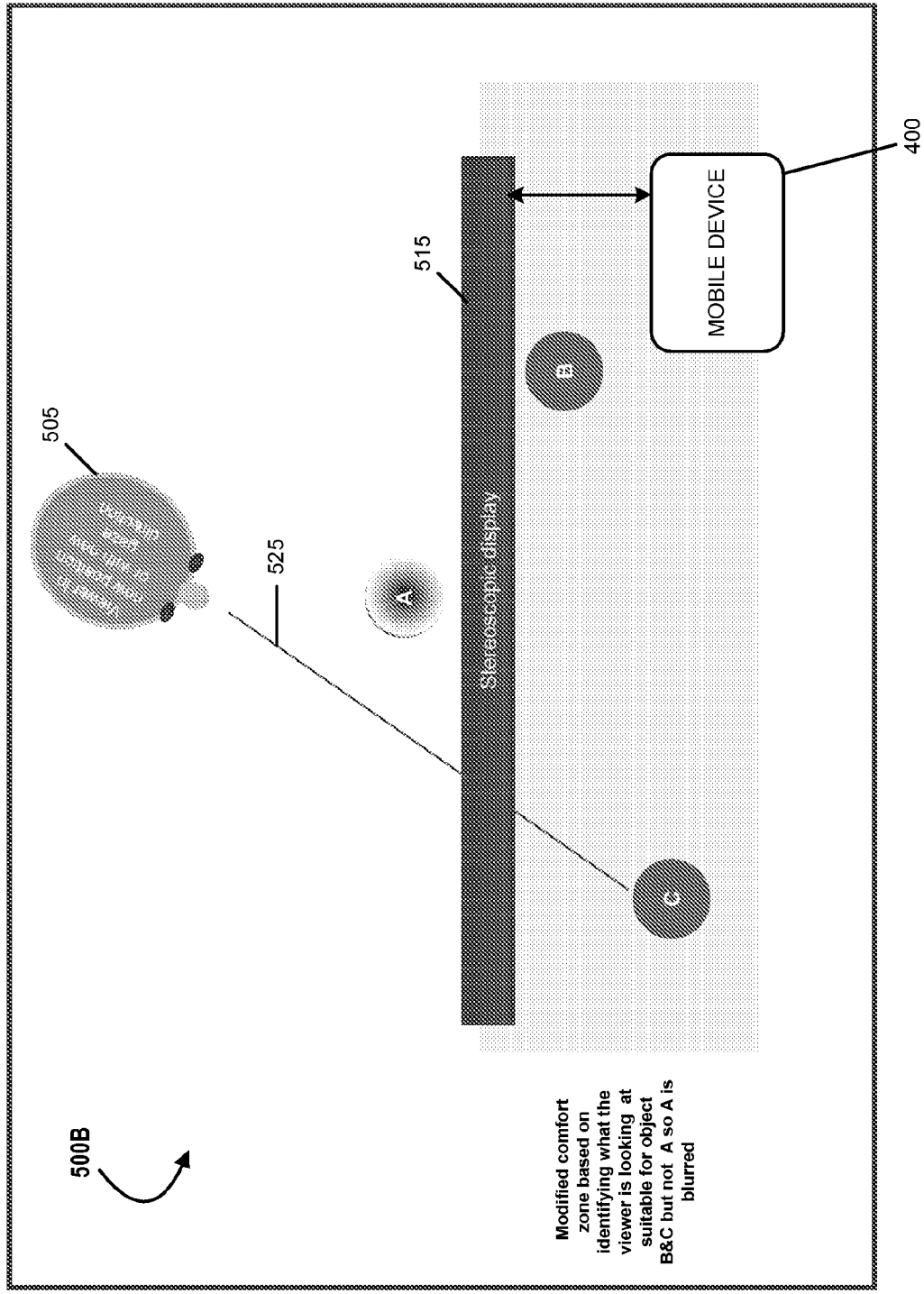

GAZE CONTROLLED FOCUSING OF STEREOSCOPIC CONTENT

BACKGROUND

Various methods may be used for presenting three-dimensional images to a user, such as a user of a mobile device. One method involves stereoscopic display of a scene. A stereoscopic display creates an illusion of three-dimensional depth from images on a two-dimensional plane. Stereoscopy presents two offset images separately to the left and right eye of the user. Both of the offset two-dimensional images are combined by the user's vision to give the perception of three-dimensional depth.

BRIEF SUMMARY

The following presents a summary of one or more embodiments of the invention in order to provide a basic understanding of such embodiments. This summary is not an exhaustive overview of all contemplated embodiments, and is intended to neither identify key or critical elements of all embodiments, nor delineate the scope of any or all embodiments. Its sole purpose is to present some concepts of one or more embodiments in a summary form as a prelude to the more detailed description that is presented later.

According to embodiments of the invention, a method generates a three dimensional image for presentation to a user. The method includes presenting, using a stereoscopic display, a representation of a scene comprising one or more objects, tracking a gaze of the user to determine a direction of gaze within the scene, determining depths associated with one or more objects in the scene, and determining which of the objects in the scene are inside and which are outside a comfort zone based at least in part on the direction of gaze of the user and the depths associated with the one or more objects in the scene.

In some embodiments, the method also includes modifying the presented representation of the scene based on the depths associated with the one or more objects in the scene. In some embodiments, the method also includes modifying the presented representation of the scene based on the direction of gaze of the user. In some embodiments, the method also includes modifying the presented representation of the scene based on the depths associated with the one or more objects in the scene and the direction of gaze of the user.

In some embodiments, the method also includes modifying the presented representation of the scene based on which of the objects are outside the comfort zone. In some such embodiments, modifying the presented representation of the scene comprises modifying one or more of the objects outside the comfort zone to reduce viewing discomfort for the user. In some of these embodiments, modifying one or more of the objects outside the comfort zone comprises blurring one or more of the objects outside the comfort zone. In others of these embodiments, modifying one or more of the objects outside the comfort zone comprises removing one or more of the objects outside the comfort zone from the representation. In yet others of these embodiments, modifying one or more of the objects outside the comfort zone comprises showing one or more of the objects outside the comfort zone using a two dimensional representation rather than a three dimensional representation.

In some embodiments, determining which of the objects in the scene are outside a comfort zone comprises identifying one or more objects proximate the direction of gaze of the user; determining depths associated with the one or more identified objects; determining a range of depths based at least in part on the depths associated with the one or more identified objects; and establishing the comfort zone based at least in part on the range of depths.

In some embodiments, the method also includes focusing the stereoscopic display based at least in part on the determination of which objects are inside the comfort zone. In some such embodiments, the method also includes tracking the gaze of the user to determine a second direction of gaze within the scene different from the direction of gaze within the scene; re-determining depths associated with one or more objects in the scene; re-determining which of the objects in the scene are inside and which are outside the comfort zone based at least in part on the second direction of gaze of the user and the re-determined depths associated with the one or more objects in the scene; and re-focusing the stereoscopic display based at least in part on the determination of which objects are inside the comfort zone.

According to embodiments of the invention, an apparatus generates a three-dimensional image for presentation to a user. The apparatus includes a stereoscopic display configured for presenting a representation of a scene comprising one or more objects to the user and a gaze-tracking tool configured for tracking a gaze of the user corresponding to a direction of gaze within the scene. The apparatus also includes a processing device configured for determining depths associated with one or more objects in the scene; and determining which of the objects in the scene are inside and which are outside a comfort zone based at least in part on the direction of gaze of the user and the depths associated with the one or more objects in the scene.

In some embodiments, the processing device is further configured for causing the stereoscopic display to modify the presented representation of the scene based on the depths associated with the one or more objects in the scene. In some embodiments, the processing device is further configured for causing the stereoscopic display to modify the presented representation of the scene base on the direction of gaze of the user. In some embodiments, the processing device is further configured for causing the stereoscopic display to modify the presented representation of the scene based on the depths associated with the one or more objects in the scene and the direction of gaze of the user.

In some embodiments, the processing device is further configured for causing the stereoscopic display to modify the presented representation of the scene based on which of the objects are outside the comfort zone. In some such embodiments, causing the stereoscopic display to modify the presented representation of the scene comprises causing the stereoscopic display to modify one or more of the objects outside the comfort zone to reduce viewing discomfort for the user. In some such embodiments, causing the stereoscopic display to modify one or more of the objects outside the comfort zone comprises causing the stereoscopic display to blur one or more of the objects outside the comfort zone. In other such embodiments, causing the stereoscopic display to modify one or more of the objects outside the comfort zone comprises causing the stereoscopic display to remove one or more of the objects outside the comfort zone from the representation. In yet other such embodiments, causing the stereoscopic display to modify one or more of the objects outside the comfort zone comprises causing the stereoscopic display to show one or more of the objects outside the comfort zone using a two dimensional representation rather than a three dimensional representation.

In some embodiments, determining which of the objects in the scene are outside a comfort zone comprises identifying one or more objects proximate the direction of gaze of the user; determining depths associated with the one or more identified objects; determining a range of depths based at least in part on the depths associated with the one or more identified objects; and establishing the comfort zone based at least in part on the range of depths.

In some embodiments, the processing device is further configured for causing the stereoscopic display to focus based at least in part on the determination of which objects are inside the comfort zone. In some such embodiments, the gaze-tracking tool is further configured for tracking the gaze of the user to determine a second direction of gaze within the scene different from the direction of gaze within the scene, and the processing device is further configured for re-determining depths associated with one or more objects in the scene; re-determining which of the objects in the scene are inside and which are outside the comfort zone based at least in part on the second direction of gaze of the user and the re-determined depths associated with the one or more objects in the scene; and causing the stereoscopic display to re-focus based at least in part on the determination of which objects are inside the comfort zone.

In some embodiments, the stereoscopic display comprises an auto-stereoscopic display.

According to embodiments of the invention, a computer program product includes a non-transitory computer-readable medium having instructions for generating a three-dimensional image for presentation to a user. The instructions include instructions for presenting, using a stereoscopic display, a representation of a scene comprising one or more objects; instructions for tracking, using a gaze-tracking tool, a gaze of the user to determine a direction of gaze within the scene; instructions for determining depths associated with one or more objects in the scene; and instructions for determining which of the objects in the scene are inside and which are outside a comfort zone based at least in part on the direction of gaze of the user and the depths associated with the one or more objects in the scene.

In some embodiments, the instructions also include instructions for causing the stereoscopic display to modify the presented representation of the scene based on the depths associated with the one or more objects in the scene. In some embodiments, the instructions also include instructions for causing the stereoscopic display to modify the presented representation of the scene based on the direction of gaze of the user. In some embodiments, the instructions also include instructions for causing the stereoscopic display to modify the presented representation of the scene based on the depths associated with the one or more objects in the scene and the direction of gaze of the user. In some embodiments, the instructions also include instructions for causing the stereoscopic display to modify the presented representation of the scene based on which of the objects are outside the comfort zone.

In some embodiments, the instructions also include instructions for causing the stereoscopic display to modify one or more of the objects outside the comfort zone to reduce viewing discomfort for the user. In some such embodiments, the instructions for causing the stereoscopic display to modify one or more of the objects outside the comfort zone include instructions for causing the stereoscopic display to blur one or more of the objects outside the comfort zone. In other such embodiments, the instructions for causing the stereoscopic display to modify one or more of the objects outside the comfort zone include instructions for causing the stereoscopic display to remove one or more of the objects outside the comfort zone from the representation.

In some embodiments, the instructions for causing the stereoscopic display to modify one or more of the objects outside the comfort zone comprise instructions for causing the stereoscopic display to show one or more of the objects outside the comfort zone using a two dimensional representation rather than a three dimensional representation. In some embodiments, the instructions for determining which of the objects in the scene are outside a comfort zone comprise instructions for identifying one or more objects proximate the direction of gaze of the user; determining depths associated with the one or more identified objects; determining a range of depths based at least in part on the depths associated with the one or more identified objects; and establishing the comfort zone based at least in part on the range of depths.

In some embodiments, the instructions also include instructions for focusing the stereoscopic display based at least in part on the determination of which objects are inside the comfort zone. In some such embodiments, the instructions also include instructions for tracking the gaze of the user to determine a second direction of gaze within the scene different from the direction of gaze within the scene; re-determining depths associated with one or more objects in the scene; re-determining which of the objects in the scene are inside and which are outside the comfort zone based at least in part on the second direction of gaze of the user and the re-determined depths associated with the one or more objects in the scene; and re-focusing the stereoscopic display based at least in part on the determination of which objects are inside the comfort zone.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
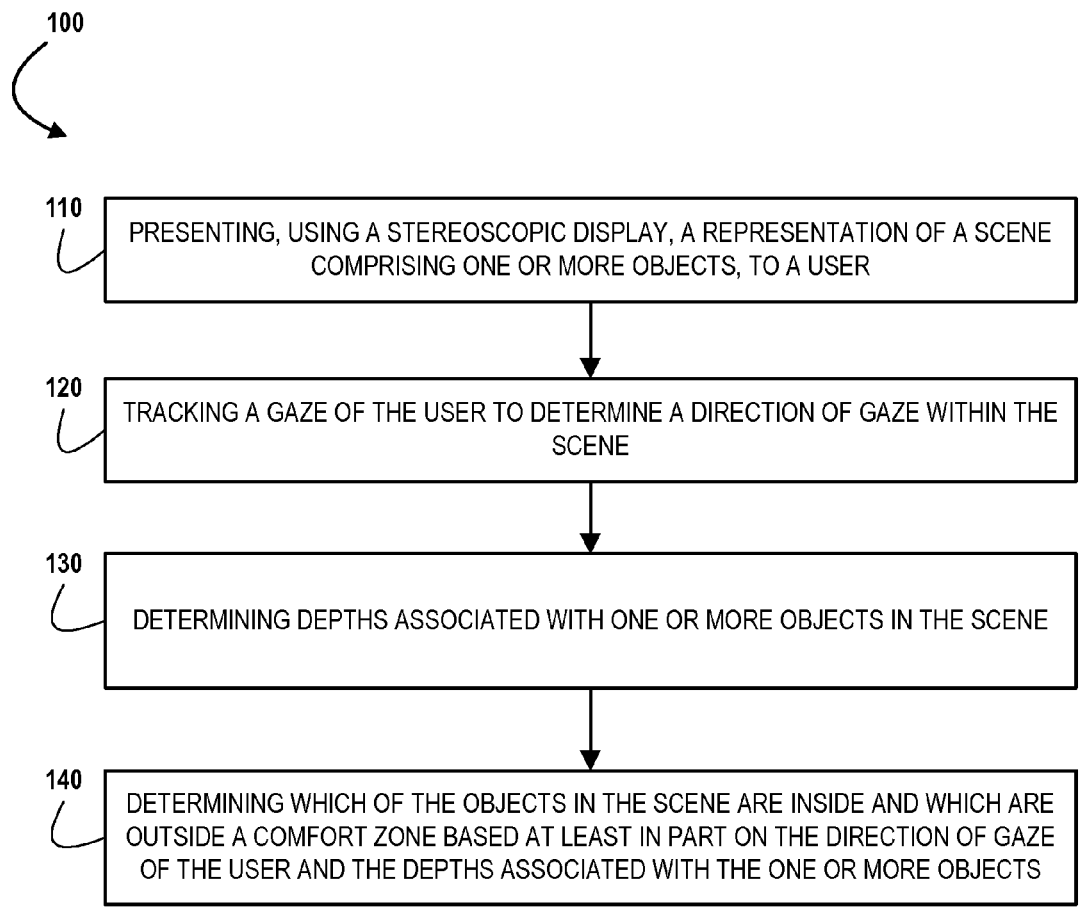
Figure 2:
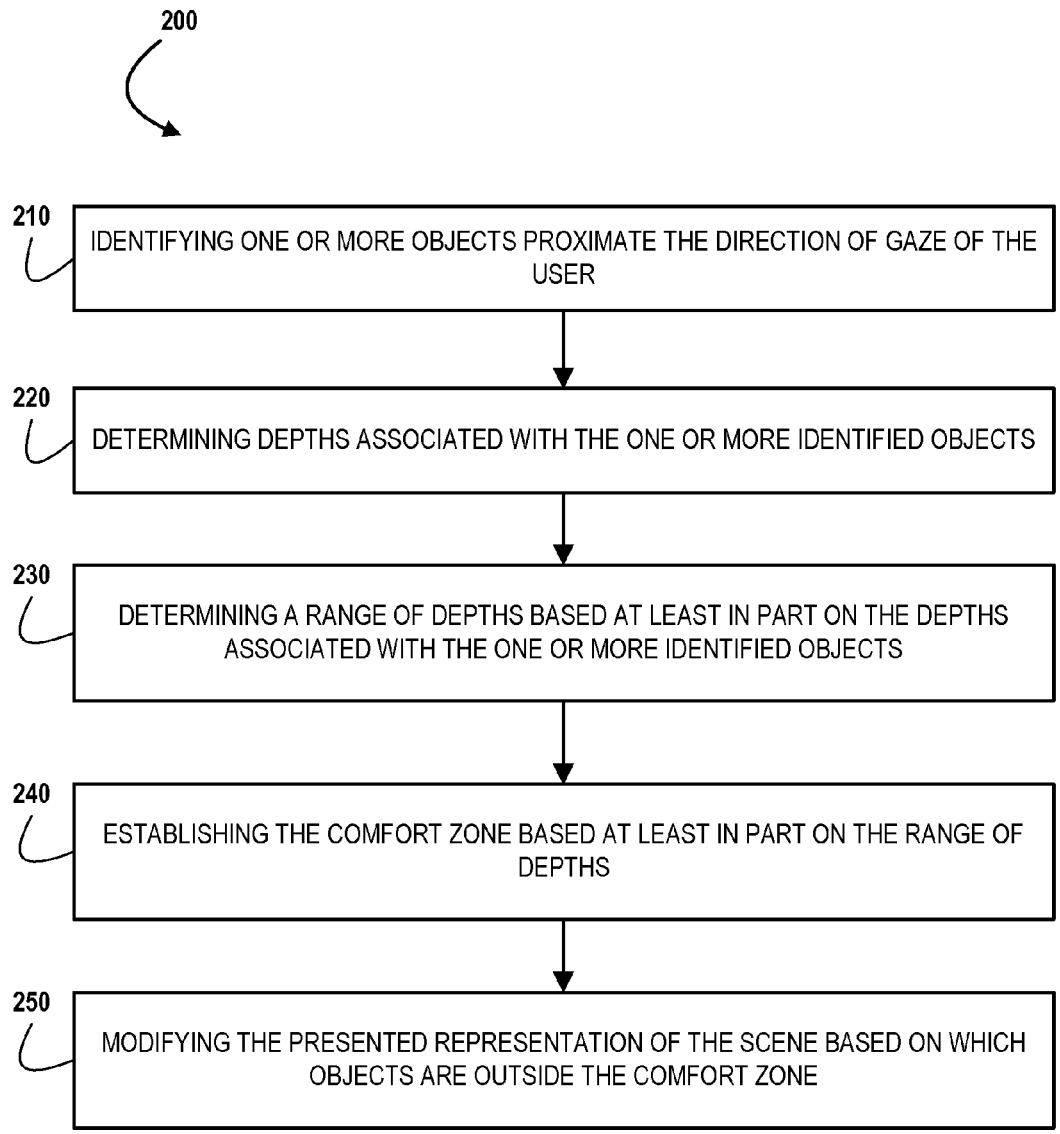
Figure 3:
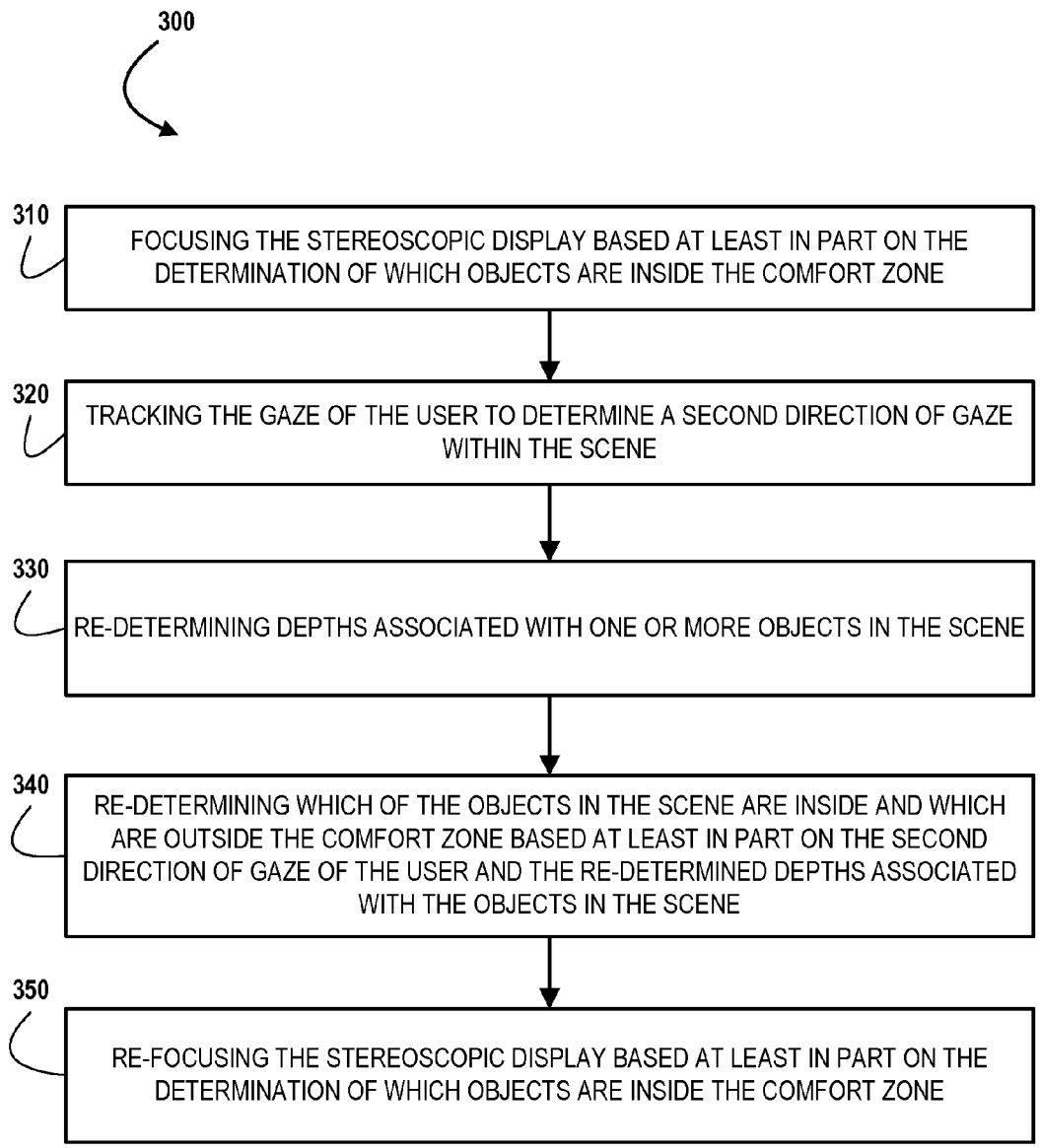
Figure 4:
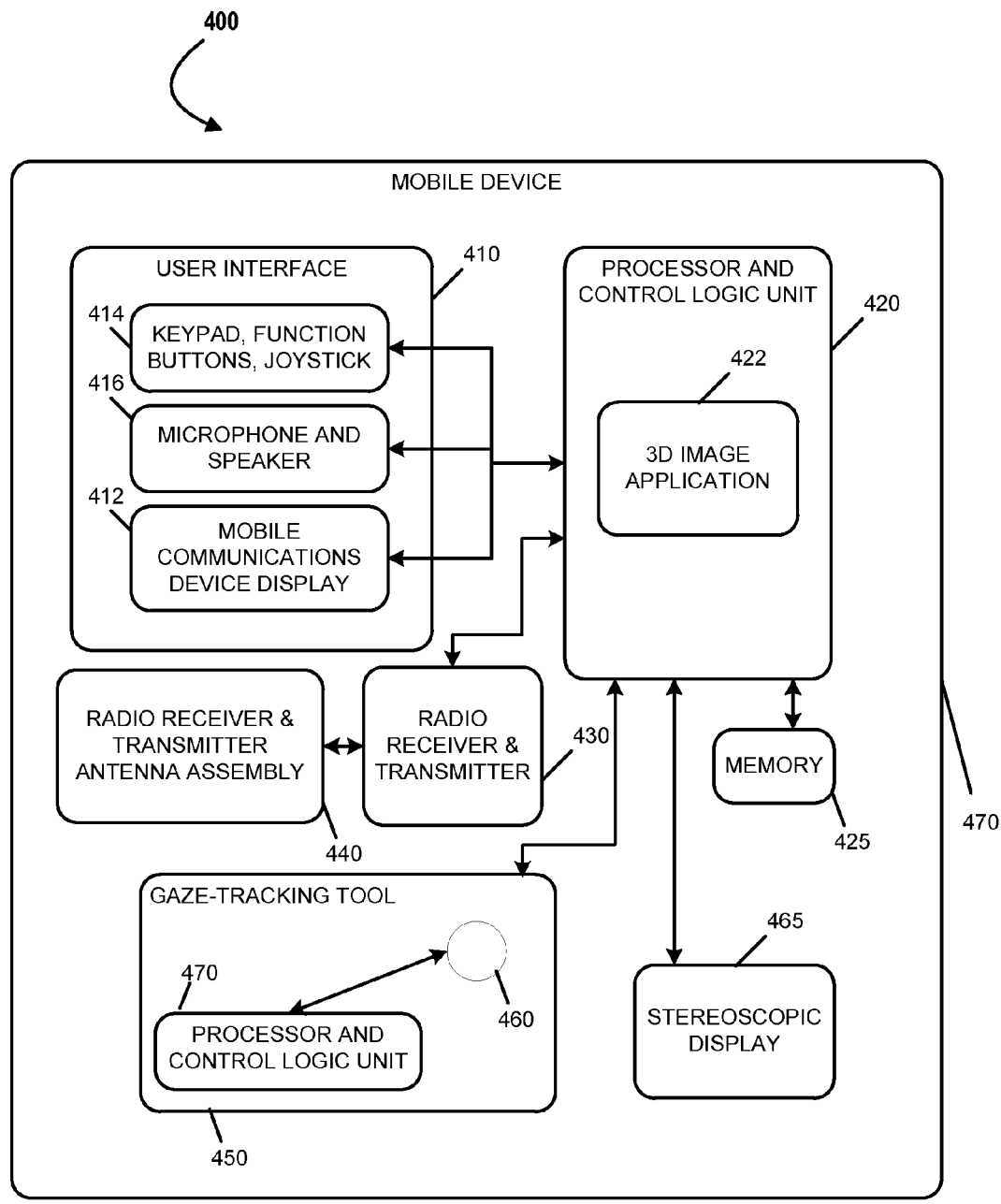

Having thus described embodiments of the invention in general terms, reference will now be made to the accompanying drawings, where:

FIG. 1 is a flowchart illustrating a general process flow for generating a three-dimensional image, in accordance with embodiments of the invention;

FIG. 2 is a flowchart illustrating another process flow for generating a three-dimensional image, in accordance with embodiments of the invention;

FIG. 3 is a flowchart illustrating another process flow for generating a three-dimensional image, in accordance with embodiments of the invention;

FIG. 4 is a block diagram illustrating components of a mobile device that houses a module for generating a three-dimensional image, in accordance with embodiments of the present invention; and FIGS. 5A and 5B are diagrams illustrating environments in which embodiments of the invention operate.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

According to embodiments of the invention, an apparatus, method and computer program product generate a three-dimensional image by presenting, using a stereoscopic display, a representation of a scene comprising one or more objects, tracking a gaze of the user to determine a direction of gaze within the scene, determining depths associated with one or more objects in the scene, and determining which of the objects in the scene are inside and which are outside a comfort zone based at least in part on the direction of gaze of the user and the depths associated with the one or more objects in the scene. In some embodiments, the method includes identifying one or more objects proximate the direction of gaze of the user, determining depths associated with the one or more identified objects, determining a range of depths based at least in part on the depths associated with the one or more identified objects, and establishing the comfort zone based at least in part on the range of depths. In some embodiments, the method includes modifying the presented representation of the scene based on which of the objects are outside the comfort zone.

In some embodiments, the method includes focusing the stereoscopic display based at least in part on the determination of which objects are inside the comfort zone, tracking the gaze of the user to determine a second direction of gaze within the scene different from the direction of gaze within the scene, re-determining depths associated with one or more objects in the scene, re-determining which of the objects in the scene are inside and which are outside the comfort zone based at least in part on the second direction of gaze of the user and the re-determined depths associated with the one or more objects in the scene, and re-focusing the stereoscopic display based at least in part on the determination of which objects are inside the comfort zone.

Referring to FIG. 1, a flowchart illustrates a method 100 for generating a three-dimensional image according to embodiments of the invention. The first step, as represented by block 110, is presenting a representation of a scene or environment or picture or the like to a user. Typically the scene includes one or more objects within the scene, located within the scene at varying depths. In some embodiments, the scene is presented to the user via a stereoscopic display, which may be or include an auto-stereoscopic display.

The next step, as represented by block 120, is tracking a gaze of the user. The gaze tracking may result in determination of a direction of gaze within the scene. That is, the direction the user is looking within the scene presented by the stereoscopic display is determined. In some embodiments, the direction of gaze is determined by a gaze-tracking tool, such as a properly configured camera and a processing device within or exterior to the camera.

The next step, as represented by block 130, is determining depths associated with objects in the scene. In some embodiments, a processing device, such as a processing device disposed within a mobile device of a user or otherwise, may determine the depths associated with the objects in a scene of an image or other presentation.

The next step, as represented by block 140, is determining which of the objects in the scene are inside and which are outside a comfort zone. This determination also may be made by a processing device, such as a processing device within or exterior to a mobile device of a user or otherwise. In some embodiments, the determination of the comfort zone may be based at least in part on the direction of gaze of the user and the depths associated with the one or more objects within the scene.

Referring now to FIG. 2, a flowchart illustrates a method 200 for generating a three-dimensional image according to embodiments of the invention. One or more or none of the steps discussed with reference to FIG. 2 may be used in conjunction with the method 100 of FIG. 1 or one or more of the steps of the method 100 of FIG. 1. The first step, as represented by block 210, is identifying one or more objects proximate the direction of gaze of the user. For example, if the user is looking in a determined direction, a processing device may analyze the scene to determine those object(s) within a predetermined distance of the user's direction of gaze. In some embodiments, the only those objects within a fixed predetermined threshold are identified, and in other embodiments, the predetermined threshold varies with respect to the depth of the objects from the user. For example, in some embodiments, objects that are closer to the user may need to be closer to the user's direction of gaze in order to be presented properly to the user via a three dimensional rendering, whereas, objects that are farther away from the user need not be as close to the gaze of the user in order to be presented properly to the user via a three dimensional rendering. Thus, the threshold for identifying objects closer to the user may be a lower number than the threshold for identifying objects farther away from the user.

The next step, as represented by block 220, is determining depths associated with one or more identified objects. In some embodiments, a processing device analyzes the scene to determine the depths, in relation to the viewer and/or user, of the identified object(s).

The next step, as represented by block 230, is determining a range of depths based at least in part on the depths associated with the one or more identified objects. In some embodiments, a predetermined range is stored in a memory, such as a memory of the mobile device or other computing device. For example, if an identified object is determined to be approximately five (5) meters from the viewer, and a predetermined range of depths is two (2) meters, then a processing device may determine a range of depths of four (4) meters to six (6) meters. In some embodiments, the predetermined range varies based on the determined depth of the object(s). For example, the predetermined range may be smaller for objects closer to the user/viewer and may be greater for objects farther away from the user/viewer. Thus, if an identified object is determined to be one hundred (100) meters from the user/viewer, then the predetermined range may be ten (10) meters rather than the two (2) meters associated with the depth of five (5) meters. Thus, the range of depths may be determined by a processing device to be ninety-five (95) meters to one hundred and five (105) meters.

The next step, as represented by block 240, is establishing the comfort zone based at least in part on the range of depths. Referring back to the examples above, the comfort zone may be established based on the range of depths, for example, the comfort zone may correspond to the range of depths of four (4) to six (6) meters for a determined object depth of five (5) meters.

The final step, as represented by block 250, is modifying the presented representation of the scene based on which objects are inside or outside the comfort zone. For example, for objects located within the comfort zone, such objects may be presented to the viewer using three dimensional technology of the stereoscopic display. For those objects outside the comfort zone, such objects may be presented to the viewer so as to reduce, minimize or eliminate visual discomfort of the user regarding the objects outside the comfort zone. For example, objects outside the comfort zone may be blurred, may be removed, may be reverted to a normal two-dimensional display or the like. As another example, objects outside the comfort zone may be de-focused so that the viewer's eyes will not attempt to focus on them, but rather only the objects within the comfort zone that are in focus.

Referring now to FIG. 3, a flowchart illustrates a method 300 for generating a three-dimensional image according to embodiments of the invention. As regarding FIG. 2, with regard to FIG. 3, one or more or none of the steps discussed with reference to FIG. 3 may be used in conjunction with the method(s) 100 and/or 200 or one or more of the steps of method(s) 100 and/or 200. The first step, as represented by block 310, is focusing the stereoscopic display based at least in part on the determination of which objects are inside the comfort zone.

The next step, as represented by block 320, is tracking the gaze of the user to determine a second direction of gaze within the scene. In some embodiments, the second direction of gaze is different than the previously determined direction of gaze (step 120).

The next step, as represented by block 330, is re-determining depths associated with one or more objects in the scene.

The next step, as represented by block 340, is re-determining which of the objects in the scene are inside and which are outside the comfort zone based at least in part on the second direction of gaze of the user and the re-determined depths associated with the objects in the scene.

The final step, as represented by block 350, is re-focusing the stereoscopic display based at least in part on the determination of which objects are inside the comfort zone.

Referring now to FIG. 4, a block diagram is presented illustrating a mobile device 400 that houses a module for generating a three-dimensional image, in accordance with embodiments of the invention. The mobile device 400 may be a cordless telephone, cellular telephone, personal digital assistant (PDA), communicator, computer device or the like and is not unique to any particular communications standard, such as Advanced Mobile Phone Service (AMPS), Digital Advanced Mobile Phone Service (D-AMPS), Global System for Mobile Communications (GSM), Code Division Multiple Access (CDMA) or the like. In some embodiments, the mobile device 400 may not have communication capability. The design of mobile device 400 illustrated in FIG. 4 is for purposes of explaining the present invention and the present invention is not limited to any particular design.

The mobile device 400 shown in FIG. 4 may include an operator or user interface 410 to facilitate controlling operation of the mobile device including initiating and conducting phone calls and other communications. The user interface may include a display 412 to provide visual signals to a subscriber or user as to the status and operation of the mobile device 400. The display 412 may be a liquid crystal display (LCD) or the like capable of presenting color images. The display 412 may provide information to a user or operator in the form of images, text, numerals, characters, a graphical user interface (GUI) and the like. Further, the display 412, which typically includes a two-dimensional screen, may be configured to present the generated three-dimensional image or images to the user of the mobile device using the two-dimensional screen. That is, the display 412 presents the image(s), which are created to include characteristics and/or features that demonstrate three-dimensional traits but are actually confined to two dimensions themselves. Thus, the images presented are not actually presented in three dimensions, but rather, are presented to appear to the user as three-dimensional images despite their display on a two dimensional screen. In some embodiments, a separate stereoscopic display 465 is part of the mobile device 400. In some embodiments, the display 412 and the stereoscopic display 465 are the same display, and in other embodiments, they are distinct displays. In some embodiments, one or both the display 412 and/or the stereoscopic display 465 are external to the mobile device 400 and are configured for communicating with the mobile device 400. In some embodiments, the stereoscopic display 465 is configured for communicating with some other computing device, such as a personal computer and/or a server rather than a mobile device 400. Accordingly, some or all the method steps discussed herein may be performed or initiated by a processing device of a mobile device and/or a processing device of another computing device such as a personal computer and/or a server or the like.

The user interface 410 may also include a keypad and function keys or buttons 414 including a pointing device, such as a joystick or the like. The keypad, function buttons and joystick 414 permit the user to communicate commands to the mobile device 400 to dial phone numbers, initiate and terminate calls, establish other communications, such as access to a mobile television provider, the Internet, send and receive email, text messages and the like. The keypad, function buttons and joystick 414 may also be used to control other operations of the mobile device 410. The keypad, function buttons and joystick 414 may also be implemented on a touch sensitive display adapted to receive tactile input.

The display 412, keypad, and function buttons 414 may be coupled to a main processor and control logic unit 420, which is also referred to herein as a processing device. The processor and control logic unit 420 may be a microprocessor or the like. The processor and logic unit 420 may include a feature, such as application 422 to enable generation of three-dimensional image(s). The functions and operations described with respect to the three-dimensional image-generating module in the methods of FIGS. 1-3 may be embodied in an application 422 for generating a three-dimensional image by presenting, using a stereoscopic display, a representation of a scene comprising one or more objects, tracking a gaze of the user to determine a direction of gaze within the scene, determining depths associated with one or more objects in the scene, and determining which of the objects in the scene are inside and which are outside a comfort zone based at least in part on the direction of gaze of the user and the depths associated with the one or more objects in the scene. In some embodiments, other steps of the methods of FIGS. 1-3 are also embodied in application 422 such as identifying one or more objects proximate the direction of gaze of the user, determining depths associated with the one or more identified objects, determining a range of depths based at least in part on the depths associated with the one or more identified objects, and establishing the comfort zone based at least in part on the range of depths. In some embodiments, the application 422 also includes instructions for modifying the presented representation of the scene based on which of the objects are outside the comfort zone, focusing the stereoscopic display based at least in part on the determination of which objects are inside the comfort zone, tracking the gaze of the user to determine a second direction of gaze within the scene different from the direction of gaze within the scene, re-determining depths associated with one or more objects in the scene, re-determining which of the objects in the scene are inside and which are outside the comfort zone based at least in part on the second direction of gaze of the user and the re-determined depths associated with the one or more objects in the scene, and re-focusing the stereoscopic display based at least in part on the determination of which objects are inside the comfort zone, and the like.

The application 422 may be embodied in hardware, firmware, software (data structures) or combinations thereof. The processor and logic unit 420 may also include other data structures, software programs, computer applications and the like to encode and decode control signals; perform communication procedures and other functions as described herein. In some embodiments, the functions of the application 422 may be executed by the user via the user interface 410. In other embodiments, the functions of the application 422 may be automatically executed by the processor and the logic unit 420 upon the occurrence of one or more triggering events. In some embodiments, the application 422 is actually more than one application, and in some embodiments, the application 422 is stored in a memory, such as memory 425.

The user interface 410 may also include a microphone and a speaker 416. The microphone 416 may receive audio or acoustic signals from a user or from another acoustic source. The microphone 416 may convert the audio or acoustic signals to electrical signals. The microphone 416 may be connected to the processor and logic unit 420 where the processor and logic unit 420 may convert the electrical signals to baseband communication signals. The processor and control logic unit 420 may be connected to a radio transmitter and receiver 430 that may convert baseband signals from the processor and control logic unit 420 to radio frequency (RF) signals. The mobile radio transmitter and receiver 430 may be connected to an antenna assembly 440 for transmission of the RF signals to a communication medium or system, such as a mobile access network (voice/data) or the like.

The antenna assembly 440 may receive RF signals over the air and transfer the RF signals to mobile radio transmitter and receiver 430. The mobile radio transmitter and receiver 330 may convert the RF signals to baseband signals. The baseband signals may be applied to the processor and control logic unit 420 which may convert the baseband signals to electrical signals. The processor and control unit 420 may send the electrical signals to the speaker 416 which may convert the electrical signals to audio signals that can be understood by the user.

The block diagram of the mobile device 400 also illustrates the various components of gaze tracking tool 450. These components include a processor and control logic unit 470 and a lens 460. The block diagram does not illustrate how these components are arranged with respect to each other. The block diagram only serves to illustrate some of the various features that may be associated with the gaze-tracking tool 450 in some embodiments and is not intended as an exhaustive depiction. The gaze-tracking tool 450 may be configured or modified, via the user interface 410, by the user of the mobile device 400 or may be automatically configured or modified by the processor and logic unit 420 and/or the processor and logic unit 470 upon the occurrence of one or more trigger events.

In some embodiments, the gaze-tracking tool 450 is an add-on device configured for connecting with the mobile device 400. In such embodiments some or all the gaze-tracking tool 450 is disposed outside a housing 470 of the mobile device 400. In some embodiments, the gaze-tracking tool 450 includes several lenses and/or a microlens array, and in some embodiments, the gaze-tracking tool 450 may or may not include a processor and control logic unit 470 and/or memory (not shown).

Referring now to FIGS. 5A and 5B, diagrams illustrate environments 500A and 500B in which a user device, such as mobile device 400 may operate. In some embodiments, such as the embodiments shown, a stereoscopic display 515 is connected to the mobile device 400, but in other embodiments, as discussed above, the stereoscopic display 515 is part of the mobile device 400 or other user device, such as a computing device like a personal computer, server or the like. As shown in FIG. 5A, a user or other viewer 505 is looking along a direction of gaze 510 directly at object A depicted via the stereoscopic display 515. According to methods discussed above, a processing device may determine object A's depth and create a comfort zone based on object A's depth and the fact that the viewer has a gaze directed at object A. The comfort zone may be established based on a range of depths (in relation to the viewer) such that other objects, such as object B are within the comfort zone. As depicted in FIG. 5A, both objects A and B are presented to the viewer in three dimensional presentation, whereas object C, which is outside the established comfort zone is presented in a manner that reduces the discomfort to the viewer. For example, object C may be depicted as blurred, two-dimensional, may be removed or otherwise.

As shown with reference to FIG. 5B, as the viewer 505 changes his or her direction of gaze, the objects within the viewer's comfort zone may change. The viewer now has a gaze 525 that is directed at object C. According to embodiments of the invention discussed above, the depth of object C may be determined and a comfort zone may be established based on the determined depth of object C. Object B, either because it is outside the viewer's line of sight and/or because it is within the predetermined range of depths defined by the comfort zone, is presented in three dimensions to the viewer, whereas object A is now outside the viewer's comfort zone. Therefore, presentation of object A is modified to alleviate the viewer's discomfort in viewing object A given the current direction of gaze 525.

In various embodiments of the invention, multiple directions of gaze are recognized by the gaze-tracking tool, such as during use of a re-focusable three-dimensional photograph and/or video presentation. For example, in some instances, gaze tracking may be very difficult because the user's gaze is always moving. Therefore, in some embodiments, a processing device may determine several depths of objects in and around one (1) or two (2) or more directions of gaze of the user over a period of time, such as over a period of one (1) second. The processing device may then average or otherwise combine the several depths and thereby determine the comfort zone. In various embodiments where the user's direction of gaze changes drastically, modification of the presentation of the objects in the scene to account for the change in direction of gaze, depth or average depth of objects, may be done gradually over a period of time. For example, when a user focuses on an object five (5) meters away and then focuses on an object one hundred (100) meters away, the gaze-tracking tool may recognize the direction of gaze has changed and therefore, the depths have changed drastically and the comfort zone must be changed drastically. However, in an effort to allow the user time to re-focus, modifications to the effected objects may be made gradually. In some embodiments, blurring certain objects outside the comfort zone may also be useful in reducing discomfort to the user in situations of re-focusable three-dimensional photograph and/or video presentation.

In various other embodiments of the invention for use in three-dimensional gaming applications, focal distance or depth to objects in the display is typically found by following a line of sight or direction of gaze to the object within the three dimensional model. However, as noted above, in some applications, gaze tracking is difficult, and so multiple object depths may be combined, such as by averaging or otherwise in order to determine the comfort zone of the viewer. For example, once several depths have been determined, they may be averaged and that number may be used as the middle of the range of depths used in establishing the comfort zone based on a predetermined range. In some instances, the direction of gaze is approximated, and the area around the direction of gaze is analyzed, such as by a processing device. Once the area is analyzed, the group of objects that has the most pixels close to the direction of gaze is chosen. These depths are combined and used in determining the comfort zone. As with the photograph/video example above, large changes in focal distance may be gradually accommodated. In various embodiments used in three-dimensional gaming applications, blurring may be used on objects outside a circle around the direction of gaze, that is, outside the established comfort zone. In some embodiments, use of mesh reduction and/or resolution reduction outside the comfort zone may also be used to reduce or eliminate discomfort to the viewer.

According to embodiments of the invention, an apparatus, method, and computer program product generate a three-dimensional image by presenting, using a stereoscopic display, a representation of a scene comprising one or more objects, tracking a gaze of the user to determine a direction of gaze within the scene, determining depths associated with one or more objects in the scene, and determining which of the objects in the scene are inside and which are outside a comfort zone based at least in part on the direction of gaze of the user and the depths associated with the one or more objects in the scene. In some embodiments, the method includes identifying one or more objects proximate the direction of gaze of the user, determining depths associated with the one or more identified objects, determining a range of depths based at least in part on the depths associated with the one or more identified objects, and establishing the comfort zone based at least in part on the range of depths. In some embodiments, the method includes modifying the presented representation of the scene based on which of the objects are outside the comfort zone.

In some embodiments, the method includes focusing the stereoscopic display based at least in part on the determination of which objects are inside the comfort zone, tracking the gaze of the user to determine a second direction of gaze within the scene different from the direction of gaze within the scene, re-determining depths associated with one or more objects in the scene, re-determining which of the objects in the scene are inside and which are outside the comfort zone based at least in part on the second direction of gaze of the user and the re-determined depths associated with the one or more objects in the scene, and re-focusing the stereoscopic display based at least in part on the determination of which objects are inside the comfort zone.

As used herein, the term "stereoscopic" or "stereoscopic display" may be or include a pair of transparent displays in the form of a pair of glasses for wearing by a user. In some embodiments, the glasses may display content as an overlay over what is seen by the user through the glasses.

As discussed above, the term "comfort zone" refers to the maximum difference in depth that can be shown to a user under certain circumstances without causing discomfort. The comfort zone is typically not an exact region or zone but rather is content dependent and estimating and/or calculating the comfort zone, in some embodiments, may require one or more assumptions to be made, such as, for example, characteristics regarding the user's vision.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for generating a three-dimensional image for presentation to a user, the method comprising:
   presenting, using a stereoscopic display, a representation of a scene comprising a plurality of objects to the user;
   tracking a gaze of the user to determine a direction of gaze within the scene;
   identifying one of the plurality of objects proximate the direction of gaze of the user;
   determining a depth associated with the identified object, wherein the depth is a proximate distance between the user and the identified object as presented in the stereoscopic display;
   determining a range of depths defined by a minimum depth and a maximum depth based on the depth associated with the identified object and a predetermined depth range, wherein the predetermined depth range increases in relation to an increase in depth associated with the identified object;
   establishing a comfort zone defined by the range of depths, wherein the comfort zone is defined by the minimum depth and the maximum depth; and
   determining which of the plurality of objects in the scene are inside and which are outside the comfort zone, wherein first objects in the scene below the minimum depth and above the maximum depth are outside of the comfort zone and second objects in the scene above the minimum depth and below the maximum depth are inside of the comfort zone.

2. The method of claim 1, further comprising:
   modifying the presented representation of the scene based on the depth associated with the identified object in the scene.

3. The method of claim 1, further comprising:
   modifying the presented representation of the scene based on the direction of gaze of the user.

4. The method of claim 1, further comprising:
   modifying the presented representation of the scene based on the depth associated with the identified object in the scene and the direction of gaze of the user.

5. The method of claim 1, further comprising:
   modifying the presented representation of the scene based on which of the objects are outside the comfort zone.

6. The method of claim 5, wherein modifying further comprises modifying one or more of the first objects outside the comfort zone to reduce viewing discomfort for the user.

7. The method of claim 6, wherein modifying one or more of the first objects outside the comfort zone comprises blurring one or more of the objects outside the comfort zone.

8. The method of claim 6, wherein modifying one or more of the first objects outside the comfort zone comprises removing one or more of the objects outside the comfort zone from the representation.

9. The method of claim 6, wherein modifying one or more of the first objects outside the comfort zone comprises showing one or more of the objects outside the comfort zone using a two dimensional representation rather than a three dimensional representation.

10. The method of claim 1, further comprising: focusing the stereoscopic display based at least in part on the determination of which objects are inside the comfort zone.

11. The method of claim 10, further comprising:
tracking the gaze of the user to determine a second direction of gaze within the scene different from the direction of gaze within the scene;
re-determining the depth associated with the identified object in the scene;
re-determining which of the objects in the scene are inside and which are outside the comfort zone based at least in part on the second direction of gaze of the user and the re-determined depth associated with the identified object in the scene; and
re-focusing the stereoscopic display based at least in part on the determination of which objects are inside the comfort zone.

12. An apparatus for generating a three-dimensional image for presentation to a user, the apparatus comprising:
a stereoscopic display configured for presenting a representation of a scene comprising a plurality of objects to the user;
a gaze-tracking tool configured for tracking a gaze of the user corresponding to a direction of gaze within the scene; and
a processing device configured for:
identifying one of the plurality of objects proximate the direction of gaze of the user,
determining a depth associated with the identified object, wherein the depth is a proximate distance between the user and the identified object as presented in the stereoscopic display,
determining a range of depths defined by a minimum depth and a maximum depth based on the depth associated with the identified object and a predetermined depth range, wherein the predetermined depth range increases in relation to an increase in depth associated with the identified object,
establishing a comfort zone defined by the range of depths, wherein the comfort zone is defined by the minimum depth and the maximum depth, and
determining which of the plurality of objects in the scene are inside and which are outside the comfort zone, wherein first objects in the scene below the minimum depth and above the maximum depth are outside of the comfort zone and second objects in the scene above the minimum depth and below the maximum depth are inside of the comfort zone.

13. The apparatus of claim 12, wherein the processing device is further configured for:
causing the stereoscopic display to modify the presented representation of the scene based on at least one of the depth associated with the identified object in the scene, the direction of gaze of the user, and the depth associated with the identified object in the scene and the direction of gaze of the user.

14. The apparatus of claim 12, wherein the processing device is further configured for:
causing the stereoscopic display to modify the presented representation of the scene based on which of the objects are outside the comfort zone, comprising at least one of:
causing the stereoscopic display to modify one or more of the first objects outside the comfort zone to reduce viewing discomfort for the user;
causing the stereoscopic display to blur one or more of the first objects outside the comfort zone;
causing the stereoscopic display to remove one or more of the first objects outside the comfort zone from the representation; and
causing the stereoscopic display to show one or more of the first objects outside the comfort zone using a two dimensional representation rather than a three dimensional representation.

15. The apparatus of claim 12, wherein the processing device is further configured for:
causing the stereoscopic display to focus based at least in part on the determination of which objects are inside the comfort zone;
wherein the gaze-tracking tool is further configured for:
tracking the gaze of the user to determine a second direction of gaze within the scene different from the direction of gaze within the scene; and
wherein the processing device is further configured for:
re-determining the depth associated with the identified object in the scene;
re-determining which of the objects in the scene are inside and which are outside the comfort zone based at least in part on the second direction of gaze of the user and the re-determined depth associated with the identified object in the scene; and
causing the stereoscopic display to re-focus based at least in part on the determination of which objects are inside the comfort zone.

16. The apparatus of claim 12, wherein the stereoscopic display comprises an auto-stereoscopic display.

17. A computer program product comprising a non-transitory computer-readable medium comprising computer-executable instructions for generating a three-dimensional image for presentation to a user, the instructions comprising:
instructions for presenting, using a stereoscopic display, a representation of a scene comprising a plurality of objects;
instructions for tracking, using a gaze-tracking tool, a gaze of the user to determine a direction of gaze within the scene;
instructions for identifying one of the plurality of objects proximate the direction of gaze of the user;
instructions for determining a depth associated with the identified object, wherein the depth is a proximate distance between the user and the identified object as presented in the stereoscopic display;
instructions for determining a range of depths defined by a minimum depth and a maximum depth based on the depth associated with the identified object and a predetermined depth range, wherein the predetermined depth range increases in relation to an increase in depth associated with the identified object;
instructions for establishing a comfort zone defined by the range of depths, wherein the comfort zone is defined by the minimum depth and the maximum depth; and
instructions for determining which of the objects in the scene are inside and which are outside the comfort zone, wherein first objects in the scene below the minimum depth and above the maximum depth are outside of the comfort zone and second objects in the scene above the minimum depth and below the maximum depth are inside of the comfort zone.

18. The computer program product of claim 17, wherein the instructions further comprise at least one of:
instructions for causing the stereoscopic display to modify the presented representation of the scene based on the depth associated with the identified object in the scene;
instructions for causing the stereoscopic display to modify the presented representation of the scene based on the direction of gaze of the user;
instructions for causing the stereoscopic display to modify the presented representation of the scene based on the depth associated with the identified object in the scene and the direction of gaze of the user; and
instructions for causing the stereoscopic display to modify the presented representation of the scene based on which of the objects are outside the comfort zone.

19. The computer program product of claim 17, wherein the instructions further comprise:
instructions for causing the stereoscopic display to modify one or more of the first objects outside the comfort zone to reduce viewing discomfort for the user, the instructions comprising at least one of:
instructions for causing the stereoscopic display to blur one or more of the first objects outside the comfort zone;
instructions for causing the stereoscopic display to remove one or more of the first objects outside the comfort zone from the representation; and
instructions for causing the stereoscopic display to show one or more of the first objects outside the comfort zone using a two dimensional representation rather than a three dimensional representation.

20. The computer program product of claim 17, wherein the instructions further comprise:
instructions for focusing the stereoscopic display based at least in part on the determination of which objects are inside the comfort zone;
instructions for tracking the gaze of the user to determine a second direction of gaze within the scene different from the direction of gaze within the scene;
instructions for re-determining the depth associated with the identified object in the scene;
instructions for re-determining which of the objects in the scene are inside and which are outside the comfort zone based at least in part on the second direction of gaze of the user and the re-determined depth associated with the identified object in the scene; and
instructions for re-focusing the stereoscopic display based at least in part on the determination of which objects are inside the comfort zone.

* * * * *